(12) United States Patent
Hirayama

(10) Patent No.: US 9,160,721 B2
(45) Date of Patent: *Oct. 13, 2015

(54) INFORMATION PROCESSING APPARATUS AND INFORMATION PROCESSING METHOD

(71) Applicant: Kabushiki Kaisha Toshiba, Minato-ku, Tokyo (JP)

(72) Inventor: Noriyuki Hirayama, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,696

(22) Filed: Oct. 21, 2014

(65) Prior Publication Data

US 2015/0036822 A1 Feb. 5, 2015

Related U.S. Application Data

(63) Continuation of application No. 13/455,881, filed on Apr. 25, 2012, now Pat. No. 8,897,444.

(30) Foreign Application Priority Data

Sep. 6, 2011 (JP) .................................. 2011-194407
Feb. 8, 2012 (JP) .................................. 2012-025600

(51) Int. Cl.
*H04L 29/06* (2006.01)
*H04W 12/08* (2009.01)
(Continued)

(52) U.S. Cl.
CPC ............ *H04L 63/0428* (2013.01); *G06F 21/00* (2013.01); *G06F 21/60* (2013.01);
(Continued)

(58) Field of Classification Search
CPC .......................... H04L 63/0428; H04W 12/08
USPC ......................................................... 380/270
See application file for complete search history.

(56) References Cited

U.S. PATENT DOCUMENTS 6,781,601 B2   8/2004 Cheung
2004/0004562 A1  1/2004 Kita et al.
(Continued)

FOREIGN PATENT DOCUMENTS

JP   H09-322148 A   12/1997
JP   2002-034018 A   1/2002
(Continued)

OTHER PUBLICATIONS

Japanese Office Action dated Aug. 7, 2012 for JP Application No. 2012-025600 filed on Feb. 8, 2012.
(Continued)

*Primary Examiner* — Peter Shaw
(74) *Attorney, Agent, or Firm* — Knobbe, Martens, Olson & Bear, LLP

(57) ABSTRACT

According to at least one embodiment, an information processing apparatus includes: a content acquiring module configured to receive or store a content according to a first copyright protection method; a filter configured to acquire PIDs from first packets of the content; an analyzing module configured to acquire a PAT/PMT from each of the PIDs; a generating module configured to generate a PMT based on the PAT/PMT according to a second copyright protection method; encrypters configured to encrypt PES payloads by managing independent sets of an encryption key and an initial vector for the respective PIDs; and a packet generating module configured to generate second packets based on encryption results.

6 Claims, 9 Drawing Sheets

(51) Int. Cl.
*G06F 21/00* (2013.01)
*G06F 21/60* (2013.01)
*H04N 21/254* (2011.01)
*H04N 21/4405* (2011.01)
*H04N 21/4408* (2011.01)
*H04N 21/4627* (2011.01)
*H04L 9/08* (2006.01)

(52) U.S. Cl.
CPC ......... *H04L 9/0827* (2013.01); *H04L 63/0471* (2013.01); *H04N 21/2541* (2013.01); *H04N 21/4405* (2013.01); *H04N 21/4408* (2013.01); *H04N 21/4627* (2013.01); *H04W 12/08* (2013.01); *H04L 2209/605* (2013.01)

(56) References Cited

U.S. PATENT DOCUMENTS

| | | |
|---|---|---|
| 2006/0036551 A1 | 2/2006 | Oliveira et al. |
| 2006/0037041 A1 | 2/2006 | Zhang |
| 2008/0232588 A1 | 9/2008 | Christison |
| 2011/0072269 A1 | 3/2011 | Takechi et al. |
| 2011/0093722 A1 | 4/2011 | Devanand |
| 2012/0288091 A1 | 11/2012 | Honke et al. |

FOREIGN PATENT DOCUMENTS

| | | |
|---|---|---|
| JP | 2002-251328 A | 6/2002 |
| JP | 2004-173027 A | 6/2004 |
| JP | 2007-312328 A | 11/2007 |
| JP | 4112342 B | 7/2008 |
| JP | 2009-505515 A | 2/2009 |
| WO | WO 2009/019842 | 2/2009 |
| WO | WO 2011/074398 | 6/2011 |

OTHER PUBLICATIONS

Digital Content Protection LLC, High-bandwith Digital Content Protection System, Interface Independence Adaptation, Revision 2.1, [online], Jul. 18, 2011 [searched on Jul. 25, 2012], The Internet <URL:http://http://www.digital-cp.com/hdcp_technologies>.

INFORMATION PROCESSING APPARATUS AND INFORMATION PROCESSING METHOD

CROSS REFERENCE TO RELATED APPLICATION(S)

This application is a continuation application of U.S. patent application Ser. No. 13/455,881, filed Apr. 25, 2012 which is based upon and claims the benefit of priority from Japanese Patent Application No. 2011-194407 filed on Sep. 6, 2011, and No. 2012-025600 filed on Feb. 8, 2012, the entire contents of each of which are incorporated herein by reference.

BACKGROUND

1. Field

The present invention relates to an information processing apparatus and an information processing method.

2. Description of the Related Art

There is a use form in which a PC picture is displayed on the screen of another apparatus such as a TV receiver through a Wi-Fi connection. In general, the entire picture is encoded again in the PC, also in the case of a copyright-protected content. This results in quality degradation of the content and delay due to the re-encoding.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, an information processing apparatus includes: a content acquiring module configured to receive or store a content according to a first copyright protection method; a filter configured to acquire PIDs from first packets of the content; an analyzing module configured to acquire a PAT/PMT from each of the PIDs; a generating module configured to generate a PMT based on the PAT/PMT according to a second copyright protection method; encrypters configured to encrypt PES payloads by managing independent sets of an encryption key and an initial vector for the respective PIDs; and a packet generating module configured to generate second packets based on encryption results.

Embodiments of the present invention will be hereinafter described.

Embodiment 1

Figure 1:
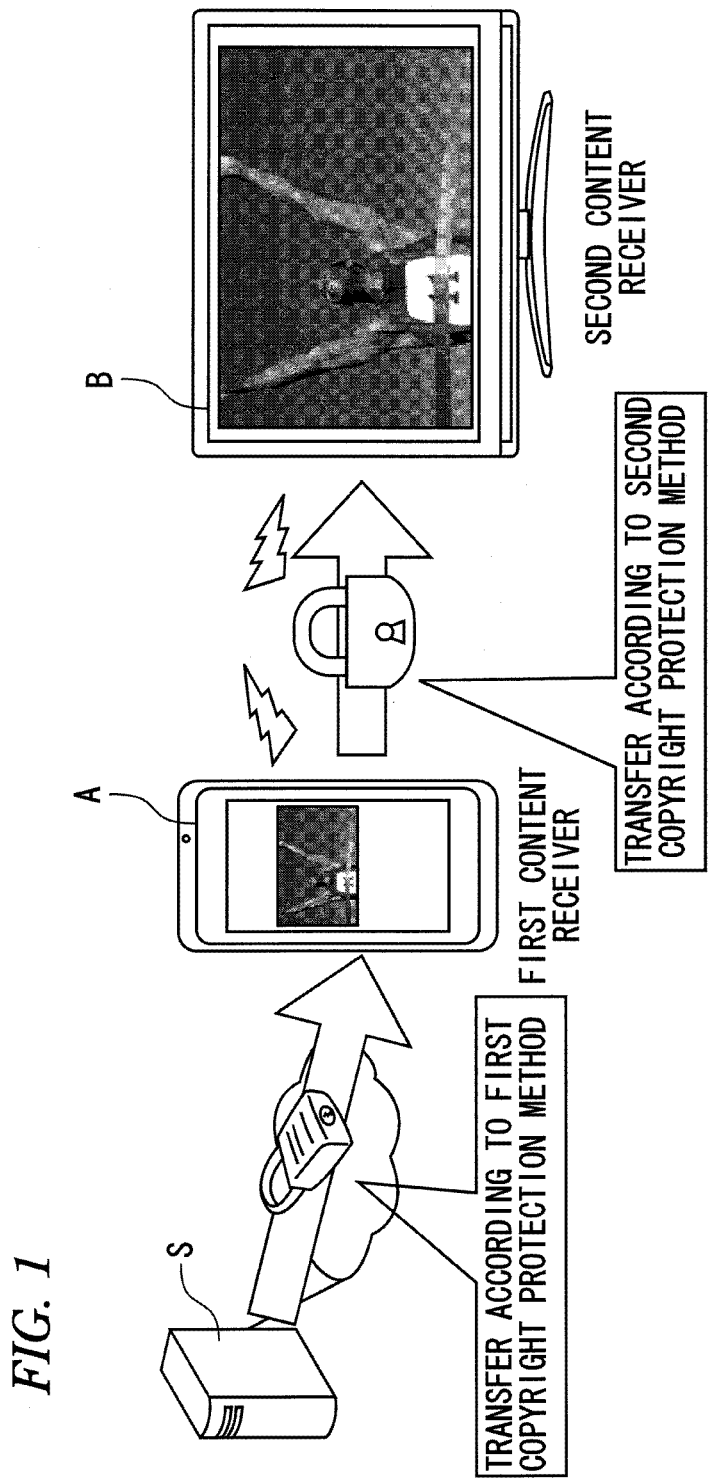
FIG. 1 shows the configuration of a copyright protection system according to a first embodiment of the present invention.

A first embodiment will be described below with reference to FIGS. 1-8. FIG. 1 shows the configuration of a copyright protection system according to the first embodiment.

A content server S sends content data provided by a VOD (video on demand) service or an IPTV service to a first content receiver A via the Internet or a CDN (contents delivery network).

Figure 2:
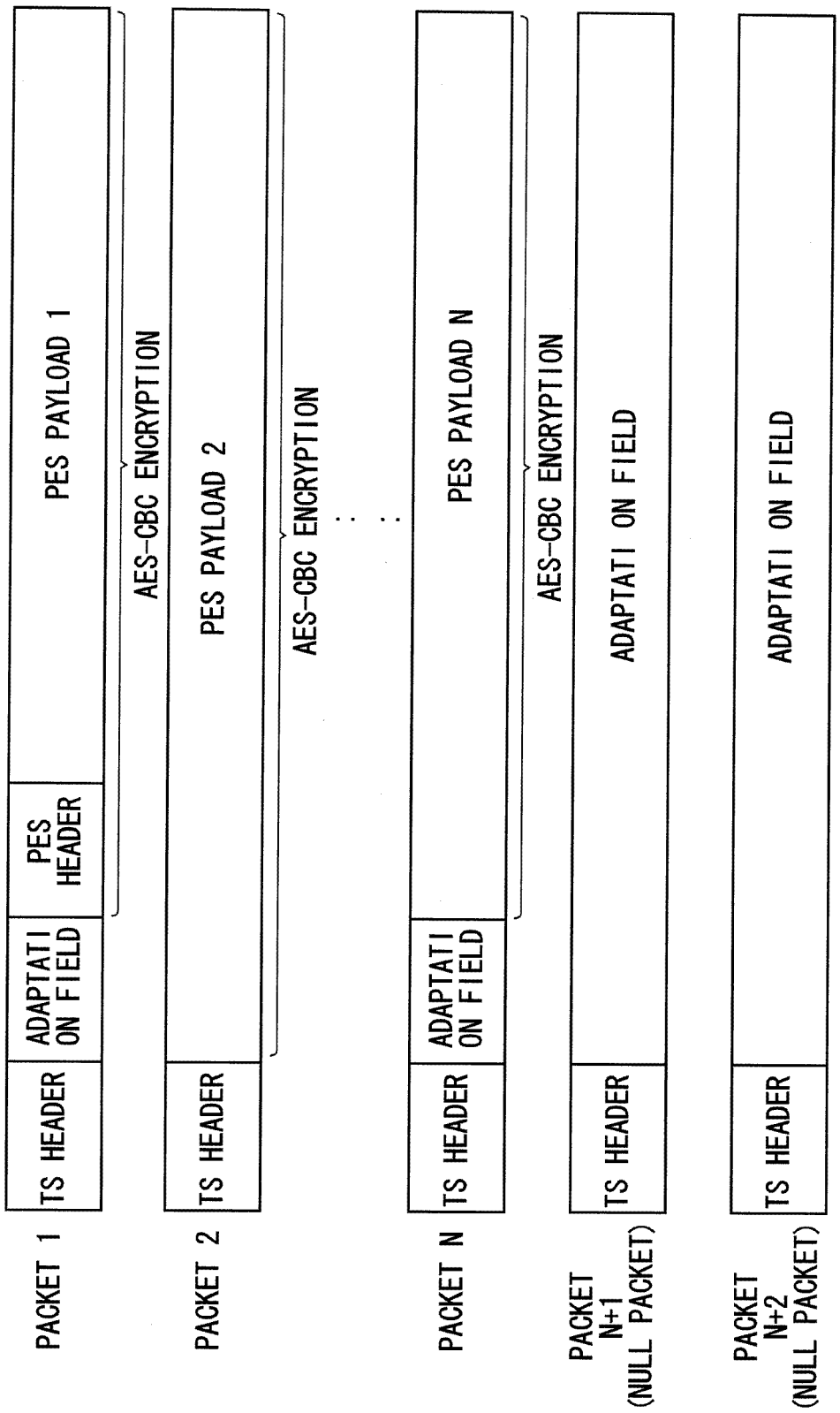
FIG. 2 shows a transport stream that is received according to a first copyright protection method in the first embodiment.

The content data provided by the VOD (video on demand) service or IPTV service is in the MPEG2-TS (transport stream) form in which a PES (packetized elementary stream) header and a PES payload are divided into plural TS packets. As shown in FIG. 2, the TS payloads are AES-CBC-encrypted according to a first copyright protection method. An encryption key for content data is determined by the content server S, and transferred from the content server S to the first content receiver A through authentication and key exchange processing which are performed between the content server S and the first content receiver A according to a method that complies with the first copyright protection method before the content server S sends the content data to the first content receiver A.

The first content receiver A, which is a PC, a tablet terminal, an STB, or the like, decrypts and decodes content data that has been received from the content server S and is encoded according to the first copyright protection method, and displays resulting content data on the screen. The first content receiver A sends the received content data to a second content receiver B by Wi-Fi or a method described later.

The first embodiment will be described in detail with reference to drawings showing hardware etc.

Figure 7:
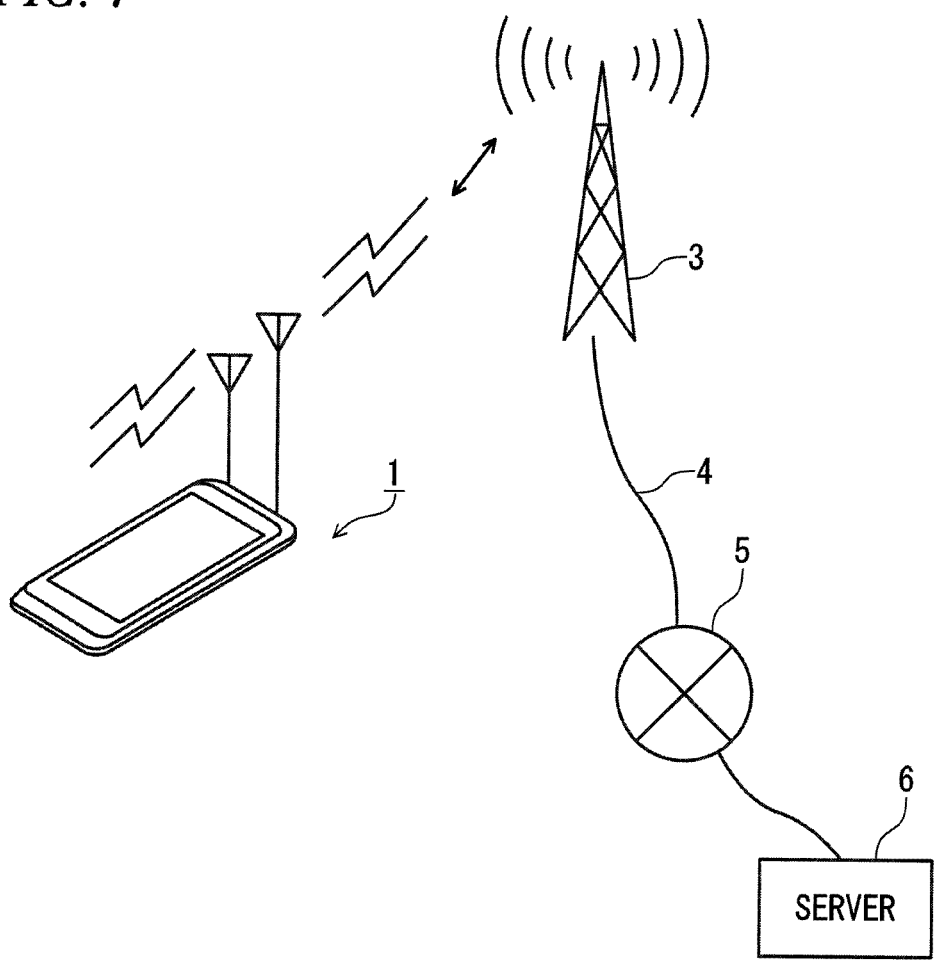
FIG. 7 shows a network which is formed between the information processing apparatus according to the first embodiment.

FIG. 7 shows a network which is formed between information processing apparatus according to the invention. In the first embodiment, a local network is formed between a cell phone 1 (content receiver A) which can be used as an information processing apparatus according to the invention and a TV receiver 2 (content receiver B; not shown) which can be used as an information processing apparatus according to the invention. Although the following description will be directed to the case that the cell phone 1 and the TV receiver 2 are used as information processing apparatus, the cell phone 1 may be replaced by any of the above-mentioned apparatus.

The cell phone 1 exchanges voice data or other data with a base station 3 of a mobile communication network according to a communication method such as W-CDMA. The base station 3 is connected to the Internet 5 via a prescribed public network. A server 6 (content server S) is connected to the Internet 5. The TV receiver 2 can communicate with the cell phone 1 using a WLAN (wireless LAN) communication module, for example. From the view point of current consumption, it is preferable that a wireless communication be performed between the cell phone 1 and the TV receiver 2 which are distant from each other by about several meters. This configuration enables a data transfer in which first the cell phone 1 performs a data communication with the server 6 via the base station 3, then the cell phone 1 establishes a connection to the TV receiver 2 using a WLAN communication module incorporated in the cell phone 1, and finally the cell phone 1 transfers, to the TV receiver 2, data that is transmitted via the base station 3.

Figure 8:
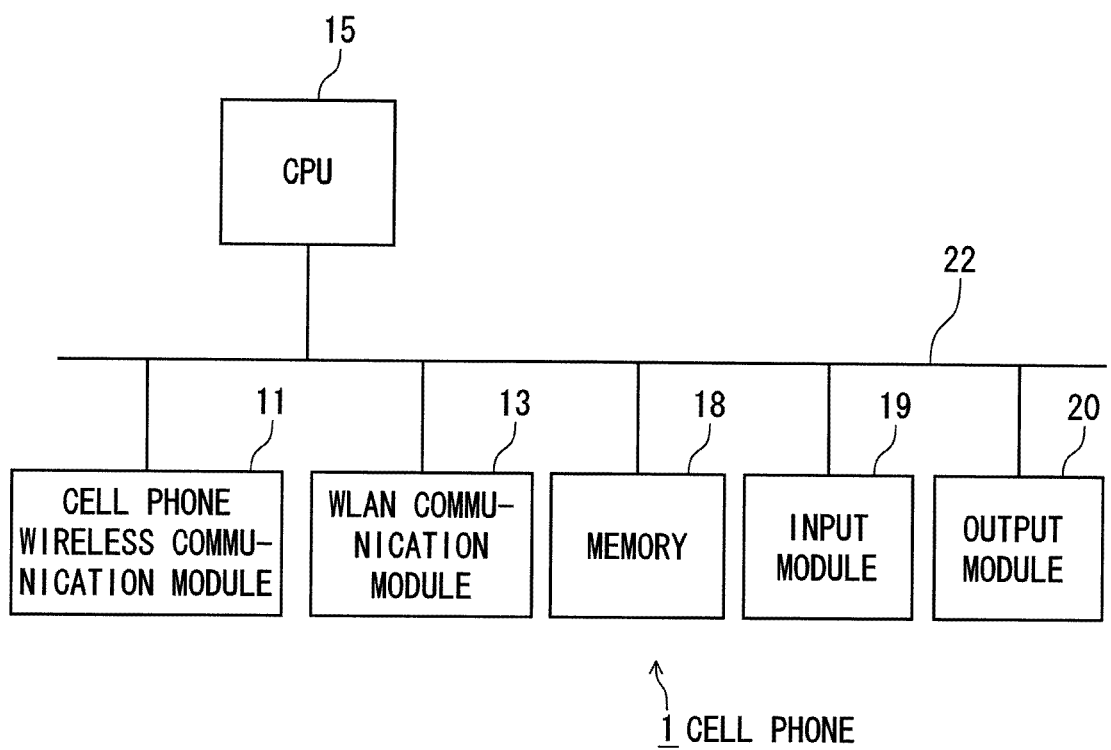
FIG. 8 shows the internal configuration of a cell phone which is an information processing apparatus according to the first embodiment.

FIG. 8 shows the internal configuration of the cell phone 1 which can be used as an information processing apparatus according to the invention. A configuration for realizing a wireless communication between the cell phone 1 and the TV receiver 2 (another information processing apparatus) will mainly be described with reference to FIG. 8 and a detailed description of a general configuration of the cell phone 1 will basically be omitted. The cell phone 1 is equipped with a cell phone wireless communication module 11, a WLAN communication module 13, a CPU 15, a memory 18, an input module 19, and an output module 20 which are connected to each other by a bus 22.

The cell phone wireless communication module 11 realizes exchange voice data or other data between cell phone 1 and the base station 3. Provided with an antenna (not shown), the cell phone wireless communication module 11 receives, from the space, a wireless signal that is transmitted from the base station 3 of the module communication network by a prescribed communication processing system. And the cell phone wireless communication module 11 emits, from the antenna to the space, a wireless signal to be transmitted wirelessly to the base station by the prescribed communication processing system. The cell phone wireless communication module 11 performs prescribed processing on a received signal and then outputs resulting data to the CPU 15 or causes the output module 20 (receiver) to output a voice. Furthermore, the cell phone wireless communication module 11 causes transmission of data that is output from the CPU 15 after being subjected to prescribed processing or a voice picked up by the input module 19 (microphone).

The WLAN communication module 13 performs a wireless LAN communication that complies with the communication standard IEEE 802.11a, IEEE 802.11b, or the like via a built-in antenna.

The CPU (central processing unit) 15 performs various kinds of processing according to programs stored in the memory 18 (ROM (read-only memory)) or various application programs and control programs including an operating system (OS) that are loaded into a RAM (random access memory) from the ROM. The CPU 15 supervises the cell phone 1 by generating various control signals and supplies them to the individual modules. When necessary, the RAM stores data etc. that are necessary for the CPU 15 to perform various kinds of processing. The memory 18 has an HDD (hard disk drive) or a flash memory which is an electrically rewritable and erasable nonvolatile memory.

The input module 19 receives an input through an input module having manipulation keys or a touch screen and outputs a resulting input signal to the CPU 15. During a voice call, the input module 19 picks up a user voice through the microphone. The output module 20 outputs a text, an image, etc. according to instructions from the CPU 15. The output module 20 is an LCD (liquid crystal display), an organic EL display, or the like. During a voice call, the output module 20 outputs a voice of a call partner via the receiver.

Figure 3:
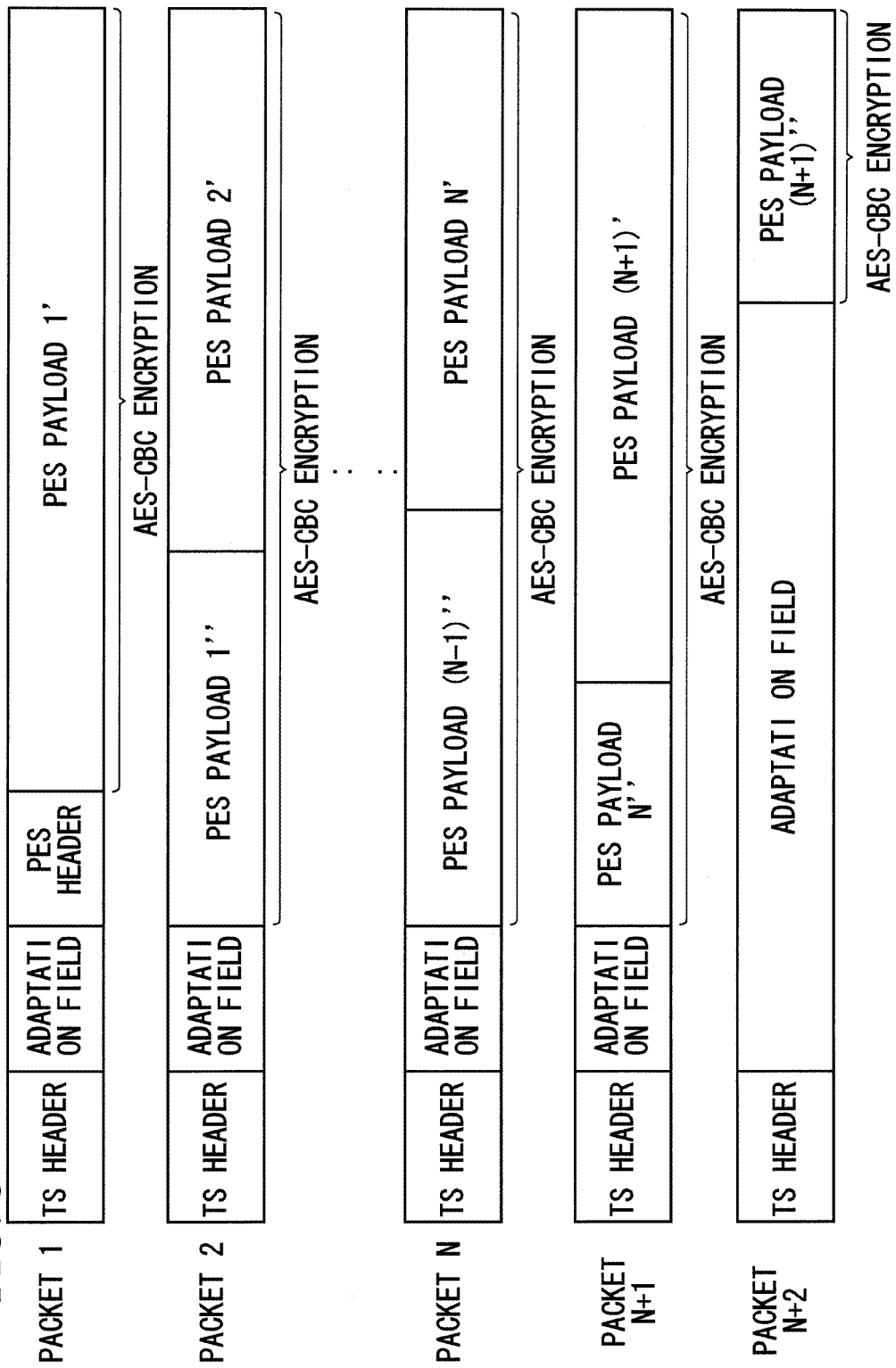
FIG. 3 shows a transport stream that is sent according to a second copyright protection method in the first embodiment.

Content data that is transmitted from the first content receiver A to the second content receiver B is in the MPEG2-TS form in which a PES header is stored in one of plural TS packets, and a PES payload is divided and stored in the plural TS packets. Besides, one PES payload is corresponding to one PES header in the MPEG2-TS form. Therefore, in the MPEG2-TS form, the PES payload is divided into plural segments, the PES header and one segment of the PES payload are stored in a packet 1, and other segments of the PES payload are stored in a packet 2 and posterior packets, as shown in FIG. 2. The combination of the PES head and the PES payload, as the above, is repeated in the MPEG2-TS form. However, when data is transmitted according to the second copyright protection method, unlike in the case of the first copyright protection method, the size of each segment of the PES payload in each TS packet should be a multiple of a prescribed size (e.g., 16 bytes) except for the tail segment of the PES payload of TS packets constituting content data. On the other hand, the TS packet size is fixed to, for example, 188 bytes. Therefore, in each TS packet, an adaptation field padded with stuffing bytes is inserted to occupy a portion other than the PES header and the segments of the PES payload, so that the size of each TS packet that consists of the TS header, PES header, segment of the PES payload, adaptation field, etc. becomes 188 bytes. As shown in FIG. 3, there are TS packets that do not include a PES header. As shown in FIG. 3, only the segment of the PES payload of each TS payload is AES-CTR-encrypted according to the second copyright protection method. For example, a segment of the PES payload n (n=1, 2, ..., N) shown in FIG. 2 is divided into segments of the PES payload n' and (n−1)'' shown in FIG. 3.

An encryption key to be used for transmitting content data according to the second copyright protection method is determined by the first content receiver A, and transferred from the content server S to the first content receiver A through authentication and key exchange processing which are performed between the first content receiver A and the second content receiver B according to a method that complies with the second copyright protection method before the first content receiver A sends the content data to the second content receiver B.

The second content receiver B, which is a display apparatus such as a TV receiver, decrypts and decodes content data that has been received from the first content receiver A and is encoded according to the second copyright protection method, and displays resulting content data on the screen. The second content receiver B should be compatible with a codec for content data provided by a VOD service or an IPTV service.

The connection interface between the first content receiver A and the second content receiver B may be either a wireless interface other than Wi-Fi or a wired interface such as Ethernet (registered trademark).

For example, the first copyright protection method is Marlin (http://www.marlinusers-japan.org/) and the second copyright protection method is HDCP (high-bandwidth digital content protection) 2.0 (http://www.digital-cp.com/).

Figure 4:
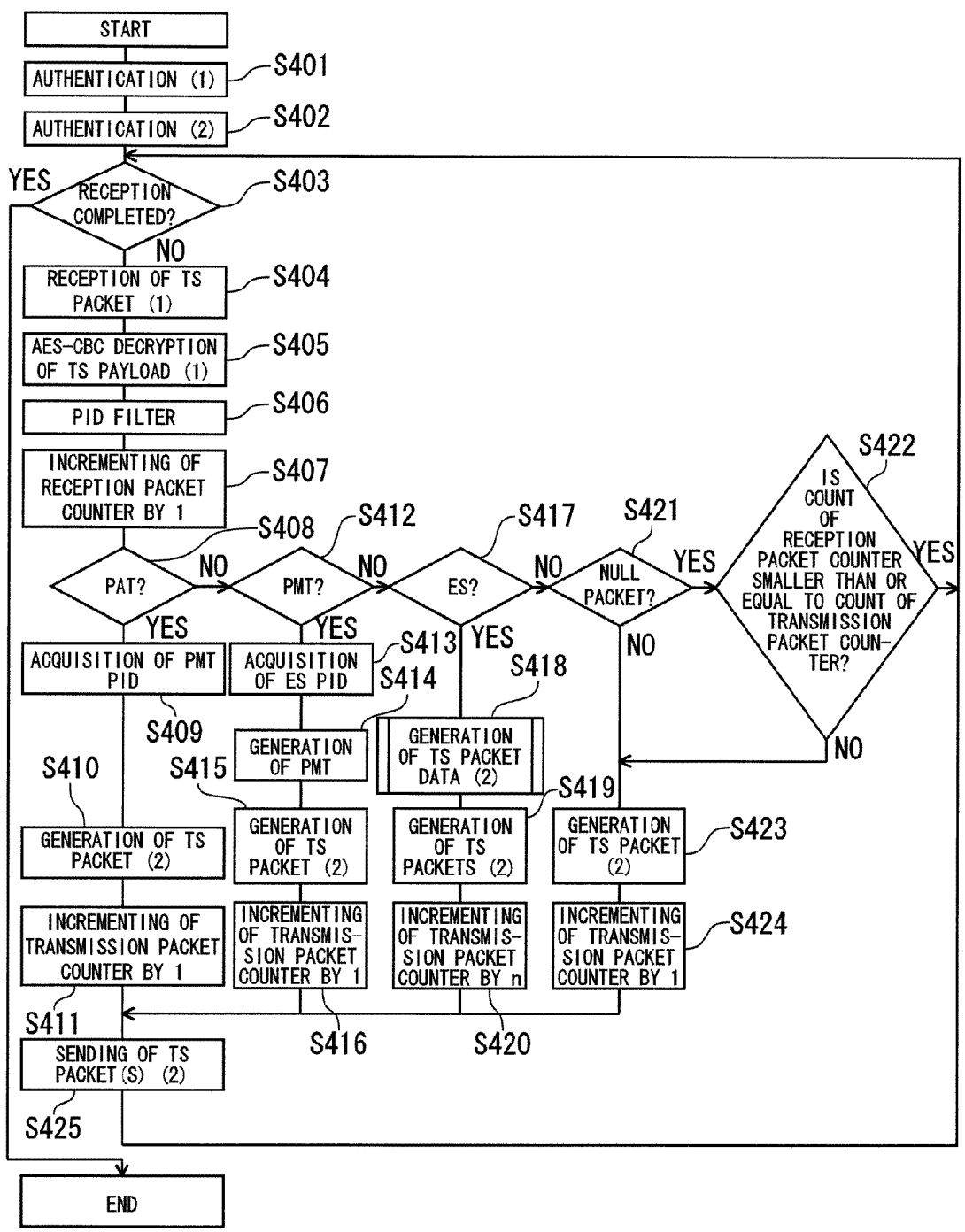
FIG. 4 is a flowchart of a copyright protection method conversion process which is executed by a first content receiver according to the first embodiment.
Figure 5:
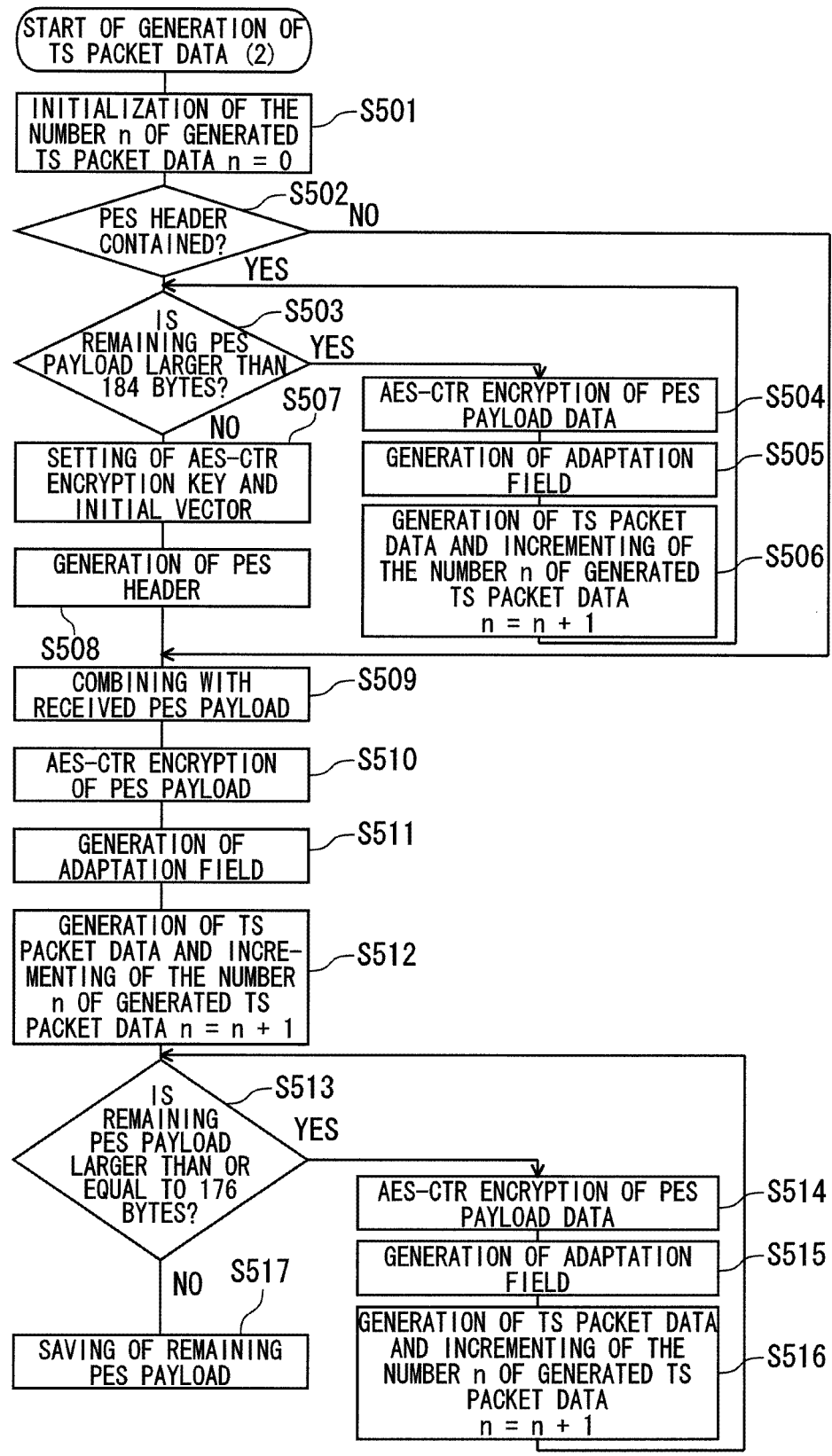
FIG. 5 is a flowchart of a process for generating TS packet data that comply with the second copyright protection method, the process being executed by the first content receiver according to the first embodiment.

A process that the first content receiver A receives content data that is encrypted according to the first copyright protection method, encrypts the received content data according to the second copyright protection method, and sends resulting content data to the second content receiver B will be described below. FIGS. 4 and 5 are flowcharts of programs which are run by the CPU 15.

At step S401, authentication and key exchange processing are performed with the content server S according to the first copyright protection method, whereby a decryption key for content data to be sent from the content server S is determined.

At step S402, authentication and key exchange processing are performed with the second content receiver B according to the second copyright protection method, whereby an encryption key and part $r_{iv}$ of an initial vector for content data to be sent to the second content receiver B are determined. In this embodiment, the initial values of the encryption key and the initial vector are kept constant for all elementary streams.

However, they may vary from one elementary stream (hereinafter abbreviated as ES) to another depending on the second copyright protection method.

If the reception the content data from the content server S has not completed yet (S403: no), the first content receiver A receives an MPEG2-TS packet at step S404 and AES-CBC-decrypts the TS payload with the decryption key at step S405. It is assumed that the initial vector for the AES-CBC decryption is kept the same in a service.

At step S406, a PID (packet identification) filter extracts a PID that is contained in the header of the received packet and identifies the kind of the packet. The initial value of the filtering subject PID is "0x0000" for a PAT and "0x1fff" for a null packet. A filtering subject PID is added in the following manner.

At step S407, a reception packet counter is incremented by 1. If the reception packet is a PAT (program association table) (S408: yes), at step S409 a PID of a PMT (program map table) is acquired by analyzing the PMT. The PMT PID is added as a filtering subject PID of the PID filter. At step S410, the reception packet itself is made a transmission packet to be transmitted to the second content receiver B. At step S411, a transmission packet counter is incremented by 1. At step S425, the generated transmission packet is sent out. Then, the process returns to step S403.

If the reception packet is a PMT (S412: yes), at step S413 a PID of an ES is acquired by analyzing the PMT. The ES PID of video, audio, a subtitle, or the like is added as a filtering subject PID of the PID filter. At step S414, a descriptor (e.g., registration_descriptor in the case of HDCP 2.0) indicating that the content is encrypted according to the second copyright protection method is added to the received PMT. At step S415, a transmission packet to be transmitted to the second content receiver B is generated. At step S416, the transmission packet counter is incremented by 1. At step S425, the generated transmission packet is sent out. Then, the process returns to step S403.

If the reception packet is an ES (S417: yes), step S418 is executed in the following manner. At step S501 (see FIG. 5), an initial value "0" is set for the number n of generated TS packet data. If payload_unit_start_indicator of the TS header contained in the reception packet is "1," the reception packet is regarded as containing a PES header (S502: yes). If the size of the remaining segment of the PES payload is larger than a size (e.g., 184 bytes) that is set as a size of a TS packet excluding a header (S503: yes), at step S504 data of 176 bytes that is a maximum multiple of 16 (AES-CTR encryption key size) that is smaller than 184 bytes is extracted from the remaining segment of the PES payload (i.e., data beginning from the head of the remaining segment of the PES payload) and AES-CTR-encrypted. At step S505, an adaptation field padded with stuffing bytes (8 bytes) is inserted before the encrypted segment of the PES payload to generate one TS packet data. At step S506, the number n of generated TS packet data is incremented by 1. The above steps are repeated (i.e., TS packet data is generated and the number n of generated TS packet data is incremented by 1) until the size of the remaining segment of the PES payload becomes smaller than 184 bytes (S503: no). If the size of the remaining segment of the PES payload is smaller than or equal to 184 bytes (S503: no), at step S504' the entire remaining segment of the PES payload is AES-CTR-encrypted. At step S505', an adaptation field that is padded with stuffing bytes so that the size of a resulting TS packet data becomes 184 bytes is inserted before the encrypted segment of the PES payload to generate one TS packet data. At step S506', the number n of generated TS packet data is incremented by 1.

Since a PES header is contained in the reception packet (S502: yes), at step S507 an AES-CRT encryption key and an initial vector are set for the ES-PID concerned. In this embodiment, the encryption key is the same as the initial value. For example, in HDCP 2.0, the value of the initial vector is given by $(r_i \text{XOR streamCtr}) \| \text{inputCtr}$. In this formula, streamCtr is equal to its immediately preceding value plus 1. And inputCtr is equal to its immediately preceding value plus a number obtained by adding 15 to the size of the entire segment of the PES payload that accompanies the immediately preceding PES header of the ES PID concerned and dividing the resulting sum by 16. This value means the number (rounded up) of 16-byte encryption blocks obtained by dividing the entire segment of the PES payload. The initial values of the encryption key and the initial vector are values calculated in the key exchange processing according to the second copyright protection method. The initial values of streamCtr and inputCtr are "0." At step S508, the encryption key and part of the initial vector are inserted into the PES header. In HDCP 2.0, a PES_private_data field is inserted into the PES header and inputCtr which is one constituent element of the initial vector and streamCtr are described. The second content receiver B can obtain an encryption key and an initial vector for decrypting the segment of the PES payload correctly by combining information obtained by the key exchange processing that was performed with the first content receiver A and PES header information received from the first content receiver A.

At step S509, irrespective of presence/absence of a PES header, the remaining segment of the PES payload is combined with the segment of the PES payload contained in the reception packet. At step S510, the remaining segment of the PES payload is AES-CTR-encrypted. The size of the encryption subject segment of the PES payload is calculated in the following manner. The size of the adaptation filed excluding stuffing bytes (if the adaptation field consists of only stuffing bytes, the received packet is regarded as containing no adaptation field) is subtracted from total size (184 bytes) of the TS payload and the adaptation field. If the received packet contains a PES header, the size of the PES header is subtracted from total size of the TS payload and the adaptation field. A maximum multiple of 16 (AES-CTR encryption key size) that is smaller than the calculated TS packet data size is employed as a size of the encryption subject segment of the PES payload. At step S511, an adaptation field is generated in which stuffing bytes are inserted so that the total size of the adaptation field, the PES header (only when it is contained), and the encrypted segment of the PES payload becomes equal to 184 bytes. At step S512, TS packet data is generated by combining the adaptation field, the PES header, and the segment of the PES payload and the number n of generated TS packet data is incremented by 1.

If the size of the remaining segment of the PES payload is larger than or equal to 176 bytes (a maximum multiple of 16 (AES-CTR encryption key size) that is smaller than 184 bytes) (S513: yes), at step S514 data of 176 bytes beginning from the head of the segment of the PES payload is AES-CTR-encrypted. At step S515, an adaptation field padded with stuffing bytes (8 bytes) is inserted before the encrypted PES payload to generate one TS packet data. At step S516, the number n of generated TS packet data is incremented by 1. The above steps are repeated (i.e., TS packet data is generated and the number n of generated TS packet data is incremented by 1) until the size of the remaining segment of the PES payload becomes smaller than 176 bytes (S513: no).

At step S517, the unencrypted segment of the PES payload data (smaller than 176 bytes) is saved as a remaining segment of the PES payload. The above-described steps S501-S517 constitute step S418 shown in FIG. 4.

At step S419, n TS packets to be sent to the second content receiver B are generated by inserting TS headers before the n TS packet data generated by the above process, respectively. The following values are set in respective fields of each TS header according to the MPEG2-TS format. The PID of the TS header is made an ES PID. A value "1" is set in payload_unit_start_indicator of the TS header if the TS packet data contains a PES header. Every time the number of TS packets increases, continuity_counter of the TS header is incremented by 1 if the TS packet data contains a TS payload.

At step S420, n is added to the transmission packet counter. At step S425, the generated packets are sent out. Then, the process returns to step S403.

If the reception packet is a null packet (S412: yes), the count of the reception packet counter and that of the transmission packet counter are compared with each other. If the count of the transmission packet counter is smaller than that of the reception packet counter (S422: no), at step S423 the reception packet is employed as it is as a transmission packet to be sent to the second content receiver B. At step S424, the transmission packet counter is incremented by 1. At step S425, the generated packet is sent out. Then, the process returns to step S403.

If the count of the transmission packet counter is larger than or equal to that of the reception packet counter (S422: yes), to adjust the difference between the size of the received content data and that of content data to be sent, no transmission packet is generated and the transmission packet counter is not incremented. Then, the process returns to step S403.

The generated transmission packets are sent to the second content receiver B sequentially.

Figure 6:
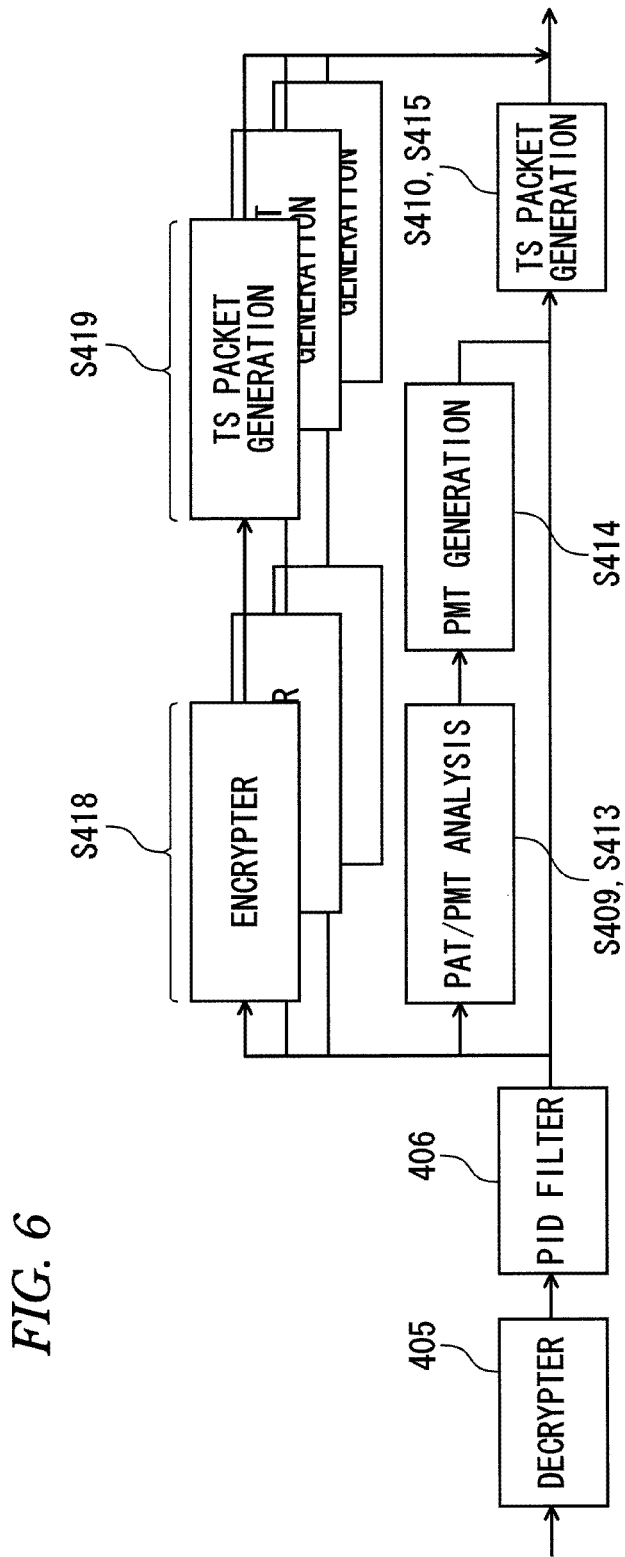
FIG. 6 is a data flow diagram of content data in the first content receiver according to the first embodiment.

The process that content data that is encrypted according to the first copyright protection method is received, then encrypted according to the second copyright protection method, and finally sent out by the first content receiver A is summarized in a data flow diagram of FIG. 6. Each encrypter manages a set of an encryption key and an initial vector for each ES and AES-CTR-encrypts its PES payload. In FIG. 6, each block is associated with a step (s) in FIG. 4 that mainly corresponds to it.

Embodiment 2

A second embodiment of the invention will be described below. Items that are the same as in the first embodiment will not be described.

Figure 9:
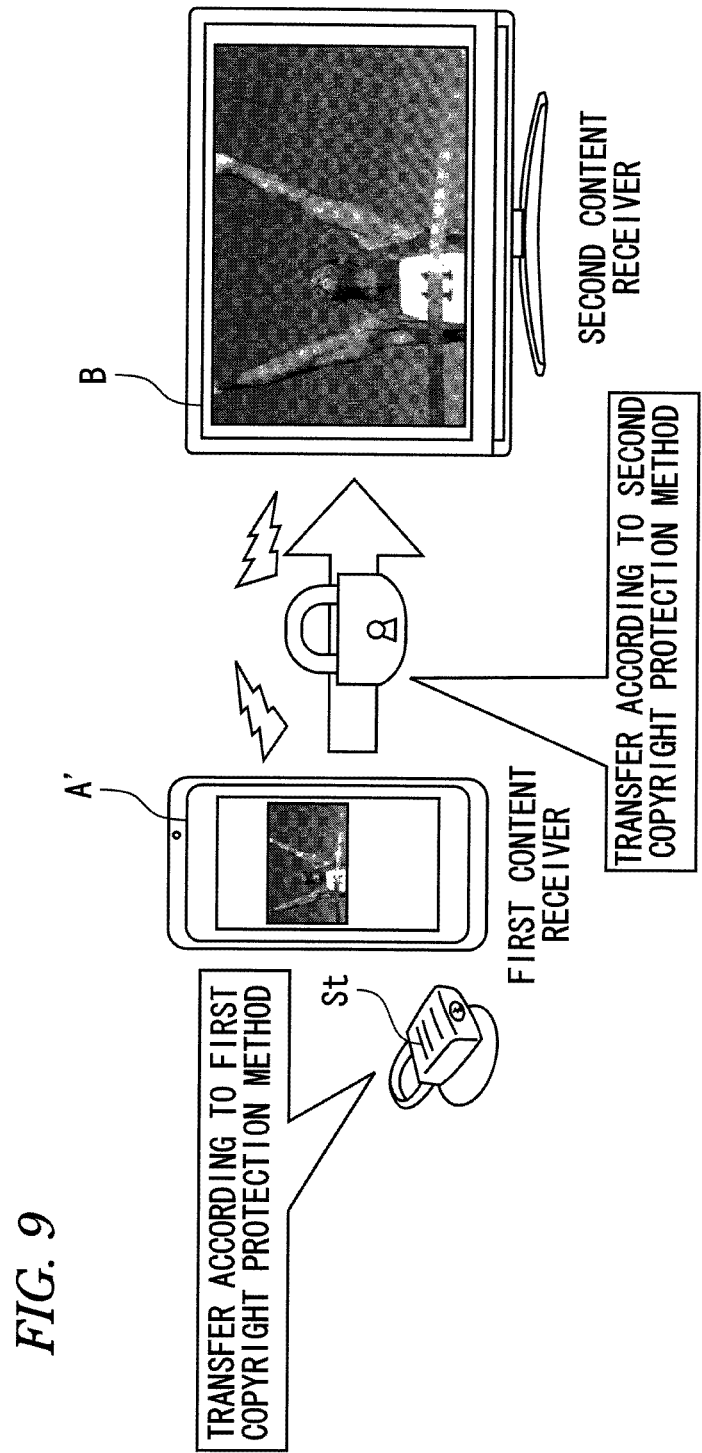
FIG. 9 shows the configuration of a copyright protection system according to a second embodiment.

FIG. 9 shows the configuration of a copyright protection system according to the second embodiment. Content data that is received by a first content receiver A' in the form of broadcasting such as digital terrestrial broadcasting is locally encrypted and stored (recorded) in an HDD or a nonvolatile memory of the first content receiver A' in advance. The encrypted content stored in the HDD or the nonvolatile memory is decrypted by a local encryption key, encrypted by the second copyright protection method, and transmitted to the second content receiver B.

A flowchart of the second embodiment is obtained by replacing "reception" in the flowchart of FIG. 4 with "reading from the HDD or the nonvolatile memory."

Embodiment 3

A third embodiment of the invention will be described below. Items that are the same as in the first or second embodiment will not be described.

The third embodiment is such that the first or second embodiment of the invention is applied to a case that, as in the Intel wireless display, the first content receiver A or A' re-encodes a picture and sends resulting content data to the second content receiver B. When a content encrypted according to the first copyright protection method is reproduced on the full screen in the first content receiver A or A' according to a user manipulation and, at the same time, reproduced by the second content receiver or when only a window in which a content encrypted according to the first copyright protection method is being reproduced is reproduced in the second content receiver B, as seen from the process described in the first or second embodiment, re-encoding need not be performed in the first content receiver A or A' during this processing.

The embodiments provide an advantage that since PES payloads themselves that are encoded for the first copyright protection method are encrypted, quality degradation of the content and delay due to re-encoding can be prevented. In particular, increase in transfer content size can be reduced to a minimum necessary value by deleting null packets in the same number as the number of increased packets.

The above-described embodiments enable functioning of the following systems A-C:

A. A copyright protection method conversion system having a first content receiver having a function of receiving a content from a network, digital broadcasting, or the like according to a first copyright protection method and a second content receiver having a function of receiving the content that is transferred from the first content receiver via a wired interface or a wireless interface according to a second copyright protection method and decoding the received content, characterized by the first content receiver which comprises a PID filter which processes a transport stream, a PAT/PMT analyzing module; a PMT generating module which is compatible with the second copyright protection method; encrypters for encrypting PES payloads by managing independent sets of an encryption key and an initial vector for respective PIDs; and a transport stream packet generating module.

The second copyright protection method has the following features:

A-1. Content data (PES header and PES payload) is divided into plural MPEG2-TS packets.

A-2. Only the segment of the PES payload is encrypted, and the size of each segment of the PES payload contained in each MPEG2-TS packet is a multiple of a fixed size. The remainder that is not included in the MPEG2-TS packet payload is padded with an adaptation field. (The MPEG2-TS packet header and portions, not including the segment of the PES payload, of the MPEG2-TS packet payloads are not encrypted.)

A-3. In content data that consists of elementary streams, different elementary streams are divided into MPEG2-TS packets in mixture and the set of an encryption key and an initial vector varies from one elementary stream to another. Part of data relating to sets of an encryption key and an initial vector are contained in a PES header.

The first copyright protection method has the following features:

A-4. Content data (PES header and PES payload) is divided into plural MPEG2-TS packets.

A-5. When a PES payload is divided into plural MPEG2-TS packets, the size of the segment of the PES payload contained in each MPEG2-TS packet payload is not necessarily a multiple of a fixed size unlike in the second copyright protection method.

B. A copyright protection method conversion system characterized in that if the number of MPEG2-TS packets that comply with the second copyright protection method is larger than or equal to the number of MPEG2-TS packets that comply with the first copyright protection method and the MPEG2-TS packets that comply with the first copyright protection method contain null packets, the MPEG2-TS packets are transferred according to the second copyright protection method with the null packets deleted which are equal in number to increased packets.

C. A copyright protection method conversion system characterized in that the second copyright protection method is a standard that succeeds HDCP 2.0.

According to the embodiments, the following advantages are obtained in a copyright protection conversion system which is characterized by an HDCP output that is free of degradations, because it is provided with a PID filter module which processes a transport stream, an encryption processing module for encrypting PES payloads by managing independent sets of an encryption key and an initial vector for respective PIDs; a transport stream packet generating module, and a content transmitter:

(1) When a copyright-protected content that complies with the first copyright protection method is transferred according to the second copyright protection method, delay due to re-encoding of the content can be prevented.

(2) When a copyright-protected content that complies with the first copyright protection method is transferred according to the second copyright protection method, the content can be transmitted to a second content receiver with no degradations.

(3) Even where a copyright-protected content that complies with the first copyright protection method cannot be decoded by a first content receiver itself, it can be decoded and viewed by another apparatus.

In particular, increase in transfer content size can be made a minimum necessary value by deleting null packets that are equal in number to increased packets.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a receiver configured to receive, from a content server via a network outside the information processing apparatus, a content complying with a first copyright protection;
   a storage configured to store the received content;
   a processor, coupled to the storage via a system bus, configured to
      acquire a first program map table (PMT) PID from a program association table (PAT), and acquire an elementary stream (ES) PID from the first PMT,
      identify types of packets of the stored content based on the acquired PIDs,
      generate a second PMT complying with a second copyright protection, by adding a HDCP registration descriptor according to the second copyright protection to the first PMT, to generate first packets,
      encrypt packetized elementary stream (PES) payloads of the stored content by using an encryption key and an initial vector,
      generate second packets by inserting an adaptation field padded with stuffing bytes to the encrypted PES payloads, and
      decrypt the stored content and decode the decrypted content;
   a display configured to display a image by using the decoded content; and
   a transmitter configured to transmit the first packets and the second packets.

2. The information processing apparatus according to claim 1, wherein:
   the receiver comprises a cellular receiver to receive the content by a cellular network, and
   the transmitter comprises a wireless LAN transmitter to transmit the first packets and the second packets by a wireless LAN.

3. The information processing apparatus according to claim 1, wherein the processor is configured to extract data having a first size from packetized elementary stream (PES) payloads and to encrypt the extracted PES payloads with respect to a second size by using the encryption key and the initial vector, the first size being equal to the integral multiple of the second size.

4. The information processing apparatus according to claim 1, wherein:
   the first size is 176 bytes;
   the second size is 16 bytes; and
   the adaptation field has 8 bytes.

5. The information processing apparatus according to claim 4, wherein the PES payloads are divided into a plurality of packets.

6. The information processing apparatus according to claim 5, the contents includes one of the PES payloads having a size not equal to the integral multiple of 16 bytes.

* * * * *